United States Patent
Matthes

(10) Patent No.: US 9,898,449 B1
(45) Date of Patent: Feb. 20, 2018

(54) SYSTEM AND METHOD FOR AUTOMATICALLY REPLACING INFORMATION IN A PLURALITY ELECTRONIC DOCUMENTS

(75) Inventor: Ryan G. Matthes, Madison, WI (US)

(73) Assignee: CDW LLC, Vernon Hills, IL (US)

( * ) Notice: Subject to any disclaimer, the term of this patent is extended or adjusted under 35 U.S.C. 154(b) by 492 days.

(21) Appl. No.: 13/441,131

(22) Filed: Apr. 6, 2012

(51) Int. Cl.
- *G06F 17/00* (2006.01)
- *G06F 17/22* (2006.01)
- *G06F 17/21* (2006.01)

(52) U.S. Cl.
CPC ........ *G06F 17/2288* (2013.01); *G06F 17/211* (2013.01)

(58) Field of Classification Search
CPC .... G06F 17/2288; G06F 17/211; G06F 17/24; G06F 17/2247
USPC ................................ 715/203, 229, 242, 277
See application file for complete search history.

(56) References Cited

U.S. PATENT DOCUMENTS

| | | | | |
|---|---|---|---|---|
| 7,702,995 | B2 * | 4/2010 | Sahota | H04L 67/325 715/203 |
| 7,917,846 | B2 * | 3/2011 | Decker | G06F 17/30905 715/234 |
| 8,438,476 | B2 * | 5/2013 | Uhlig et al. | 715/251 |
| 8,881,013 | B2 * | 11/2014 | Lyons | G06F 3/048 715/229 |
| 2003/0069908 | A1 * | 4/2003 | Anthony | G06F 17/2247 715/251 |
| 2007/0011038 | A1 * | 1/2007 | Kawabuchi et al. | 705/7 |
| 2008/0002218 | A1 | 1/2008 | Wang et al. | |
| 2008/0077621 | A1 * | 3/2008 | Borgsmidt | G06F 17/30592 |

(Continued)

FOREIGN PATENT DOCUMENTS

CN    102455996    5/2012

OTHER PUBLICATIONS

Maryati Mohd Yusof, Evaluation of the clinical process in a critical care information system using the Lean method, 2012, 1-3.*

(Continued)

*Primary Examiner* — Scott Baderman
*Assistant Examiner* — Hassan Mrabi
(74) *Attorney, Agent, or Firm* — Marshall, Gerstein & Borun LLP; Randall G. Rueth

(57) ABSTRACT

In a method for processing electronic documents, an indication of a plurality of electronic source documents is received with one or more computing devices that each have a processor executing at least a portion of an electronic document processing application and a memory coupled to the processor to store associated data. An indication of an electronic destination location is received. An indication of particular source document content is received. An indication of one or more processing actions to be performed with respect to the particular source document content is received. One or more occurrences of the particular source document content within the plurality of electronic source documents are detected. The one or more processing actions are performed so as to generate the electronic output content, without presenting contents of the plurality of electronic source documents to a user. The electronic output content is written to the electronic destination location.

23 Claims, 9 Drawing Sheets

(56) References Cited

U.S. PATENT DOCUMENTS

| | | | | |
|---|---|---|---|---|
| 2008/0195934 A1* | 8/2008 | Kim | ................... | G06F 17/2247 715/235 |
| 2008/0282152 A1* | 11/2008 | McKnight et al. | ........... | 715/255 |
| 2009/0076792 A1* | 3/2009 | Lawson-Tancred | .. | G06F 17/212 704/2 |
| 2012/0246519 A1* | 9/2012 | Savov | ................ | G06F 11/3664 714/46 |
| 2012/0311426 A1* | 12/2012 | Desai et al. | ................... | 715/227 |
| 2013/0097487 A1* | 4/2013 | Alli | ....................... | G06F 17/227 715/239 |
| 2015/0261729 A1* | 9/2015 | Davis | .................... | G06F 17/218 715/234 |

OTHER PUBLICATIONS

2007 Microsoft Office System Migration Guidance: Microsoft Office Migration Planning Manager, downloaded from the Internet at: <http://www.microsoft.com/en-us/download/details.aspx?id=21888#filelist> (2006).
A-PDF Word to PDF, downloaded from the Internet at: <http://www.a-pdf.com/word-to-pdf/> (Sep. 21, 2008).
ABC Amber Text Converter, downloaded from the Internet at: <<http://www.thebeatlesforever.com/processtext/abctxt.html> (Dec. 9, 2003).
Batch converter for Word 97-2003 DOC, RTF and Works WPS format to Word 2007/2013 DOCX/M formats, downloaded from the Internet at: <http://www.gmayor.com/works_batch_converter.htm> (Jul. 9, 2009).
OOoConv—Tools for OpenOffice.org, downloaded from the Internet at: <<http://oooconv.free.fr/batchconv/batchconv_en.html> (May 1, 2003).
Bulk Rename Utility, downloaded from the Internet at: <http://www.bulkrenameutility.co.uk/Download.php> (Oct. 21, 2004).
Bulk Word Protection Utility, downloaded from the Internet at: <http://www.codeproject.com/Articles/35222/Bulk-Word-Protection-Utility> (Apr. 10, 2009).
Easy Microsoft Word Properties, downloaded from the Internet at:<http://www.littlepig.com.au/software/software.htm> (Oct. 28, 2004).
How to automatically convert many documents to Word 2002 format, downloaded from the Internet at: <https://support.microsoft.com/en-us/kb/313714#/en-us/kb/313714> (Sep. 27, 2006).
How to Batch Convert PDF Files to Word, downloaded from the Internet at: <http://www.addictivetips.com/windows-tips/how-to-batch-convert-pdf-files-to-word-format/> (Apr. 8, 2009, initial release).
How to Find & Replace All on a Batch of Documents in the Same Folder, downloaded from the Internet at: <http://word.mvps.org/FAQs/MacrosVBA/BatchFR.htm> (Feb. 27, 2004).
Quick Directory Tree, Pearson Software Consulting, downloaded from the Internet at: <http://www.cpearson.com/Excel/QuickTree.aspx> (Aug. 2, 2010).
Mac OSX Automator: Your Personal Automator Assistant, downloaded from the Internet at: <http://www.macosxautomation.com/automator> (Apr. 29, 2005).
mso2000:Batch Convert Microsoft Office Documents to OpenOffice Documents, downloaded from the Internet at: <http://leapon.net/en/mso2ooo-batch-convert-microsoft-office-documents-openoffice-documents> (Jun. 21, 2007).
Process All Documents in a Specified Directory, VBA Express, downloaded from the Internet at: <http://www.vbaexpress.com/kb/getarticle.php?kb_id=76> (Apr. 5, 2005).
UNOCONV: Convert Between Any Document Format Supported by OpenOffice, downloaded from the Internet at: <http://dag.wiee.rs/home-made/unoconv/> (May 13, 2007).
Useful File Utilities: Information About Batch Replacer for MS Word, downloaded from the Internet at: <http://www.replsoft.com/brformsword.html> (Mar. 26, 2004).
VBA Find and Replace, The Anchorage: personal website of Gregory K. Maxey, Commander USN (retired), downloaded from the Internet at: <http://gregmaxey.mvps.org/word_tip_pages/vba_find_and_replace.html> (May 15, 2006).
VBA Open File/Run Code/Close & Save/Open Next File, downloaded from the Internet at: <http://www.mrexcel.com/forum/excel-questions/471802-visual-basic-applications-open-file-run-code-close-save-open-next-file.html> (Jun. 1, 2010).
Word for Windows Batch Conversion Macro, downloaded from the Internet at: <https://support.microsoft.com/en-us/kb/107439#/en-us/kb/107439> (Aug. 16, 2005).
WordConverterExe file conversion software, Softinterface®, downloaded from the Internet at: <http://www.softinterface.com/WCE/WCE.htm>, first published Dec. 19, 2001.

* cited by examiner

SYSTEM AND METHOD FOR AUTOMATICALLY REPLACING INFORMATION IN A PLURALITY ELECTRONIC DOCUMENTS

TECHNICAL FIELD

This disclosure relates generally to electronic documents and, more particularly, to processing electronic documents.

BACKGROUND

An organization may maintain numerous electronic documents that are used for a variety of purposes, including contractual purposes. For example, an organization may maintain electronic documents pertaining to Statements of Work (SOWs) that the organization has entered into, or is to enter into, with its customers and/or providers. Such electronic documents may include completed SOWs, SOW templates, electronic documents containing content that may need to be inserted into one or more SOWs, etc.

In some cases, electronic documents, including those pertaining to SOWs, are required to be updated in response to changes in business requirements, changes in governing agreements with customers or providers, and other factors.

SUMMARY

In some embodiments, a method for processing electronic documents includes receiving, with one or more computing devices each having a processor executing at least a portion of an electronic document processing application and a memory coupled to the processor to store data associated with execution of the electronic document processing application, an indication of a plurality of electronic source documents that are to be processed with the electronic document processing application. The method also includes receiving, with the one or more computing devices, an indication of an electronic destination location to which electronic output content is to be written after processing of the plurality of electronic source documents. The method additionally includes receiving, with the one or more computing devices, an indication of particular source document content for which each of the plurality of electronic source documents is to be searched during the processing of the plurality of electronic source documents. The method further includes receiving, with the one or more computing devices, an indication of one or more processing actions that are to be performed with respect to the particular source document content within the plurality of electronic source documents. The method also includes detecting, with the one or more computing devices, one or more occurrences of the particular source document content within the plurality of electronic source documents. The method additionally includes performing, with the one or more computing devices, the one or more processing actions with respect to the one or more occurrences of the particular source document content based on detecting the one or more occurrences of the particular source document content so as to generate the electronic output content, without the one or more computing devices presenting contents of the plurality of electronic source documents to a user of the one or more computing devices. The method further includes writing, with the one or more computing devices, the electronic output content to the electronic destination location.

In other embodiments, a system for processing electronic documents includes one or more computing devices each having a processor and a memory coupled to the processor. The processor of at least one of the one or more computing devices is configured to execute an electronic document processing application. The memory of at least one of the one or more computing devices is configured to store data associated with execution of the electronic document processing application. The one or more computing devices are configured to receive an indication of a plurality of electronic source documents that are to be processed with the electronic document processing application. The one or more computing devices are also configured to receive an indication of an electronic destination location to which electronic output content is to be written after processing of the plurality of electronic source documents. The one or more computing devices are additionally configured to receive an indication of particular source document content for which each of the plurality of electronic source documents is to be searched during the processing of the plurality of electronic source documents. The one or more computing devices are further configured to receive an indication of one or more processing actions that are to be performed with respect to the particular source document content within the plurality of electronic source documents. The one or more computing devices are also configured to detect one or more occurrences of the particular source document content within the plurality of electronic source documents. The one or more computing devices are additionally configured to perform the one or more processing actions with respect to the one or more occurrences of the particular source document content based on detection of the one or more occurrences of the particular source document content so as to generate the electronic output content, without presenting contents of the plurality of electronic source documents to a user of the one or more computing devices. The one or more computing devices are further configured to write the electronic output content to the electronic destination location.

In still other embodiments, a tangible non-transitory computer-readable medium stores computer-executable instructions for use in processing a plurality of electronic source documents. The computer-executable instructions, when executed by one or more processors, cause the one or more processors to search each of the plurality of electronic source documents for particular source document content. The computer-executable instructions, when executed by the one or more processors, also cause the one or more processors to perform one or more processing actions with respect to one or more occurrences of the particular source document content that the one or more processors detect when searching each of the plurality of electronic source documents, so as to generate electronic output content based on the particular source document content. The computer-executable instructions, when executed by the one or more processors, additionally cause the one or more processors to cause one or more progress indicators to be presented to the user via at least one of a display device or one or more other input/output devices communicatively coupled to the one or more processors while performing the one or more processing actions with respect to the one or more detected occurrences of the particular source document content, without causing contents of the plurality of electronic source documents to be presented to a user via any of a display device or one or more other input/output devices communicatively coupled to the one or more processors. The computer-executable instructions, when executed by the one or more processors, further cause the one or more processors to write the electronic output content to a plurality of electronic destination documents so that portions of the electronic output content are written to locations within the plurality of electronic destination documents that correspond to locations within the plurality of electronic source documents at which the one or more processors detected the one or more occurrences of the particular source document content.

In still other embodiments, a method for migrating contents of one or more electronic documents includes receiving, with an electronic document processing application executing on one or more computing devices each having a processor coupled to a memory configured to store data associated with execution of the electronic document processing application, an indication of one or more electronic source documents. The method also includes receiving, with the electronic document processing application executing on the one or more computing devices, an indication of one or more electronic destination documents. The method additionally includes receiving, with the electronic document processing application executing on the one or more computing devices, an indication of a plurality of electronic content elements that the electronic document processing application is to migrate from the one or more electronic source documents to the one or more electronic destination documents. The method further includes searching, with the electronic document processing application executing on the one or more computing devices, each of the one or more electronic source documents for any of the plurality of electronic content elements. The method also includes migrating, with the electronic document processing application executing on the one or more computing devices, each of the plurality of electronic content elements detected from searching each of the one or more electronic source documents to a location within an electronic destination document that corresponds to a location of the electronic content element within one of the one or more electronic source documents, without the one or more computing devices presenting contents of the one or more electronic source documents to a user of the one or more computing devices.

Other systems, methods, features and advantages of the invention will be, or will become, apparent to those skilled in the art upon examination of the following figures and detailed description. It is intended that all such additional systems, methods, features and advantages included within this description be within the scope of the invention.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
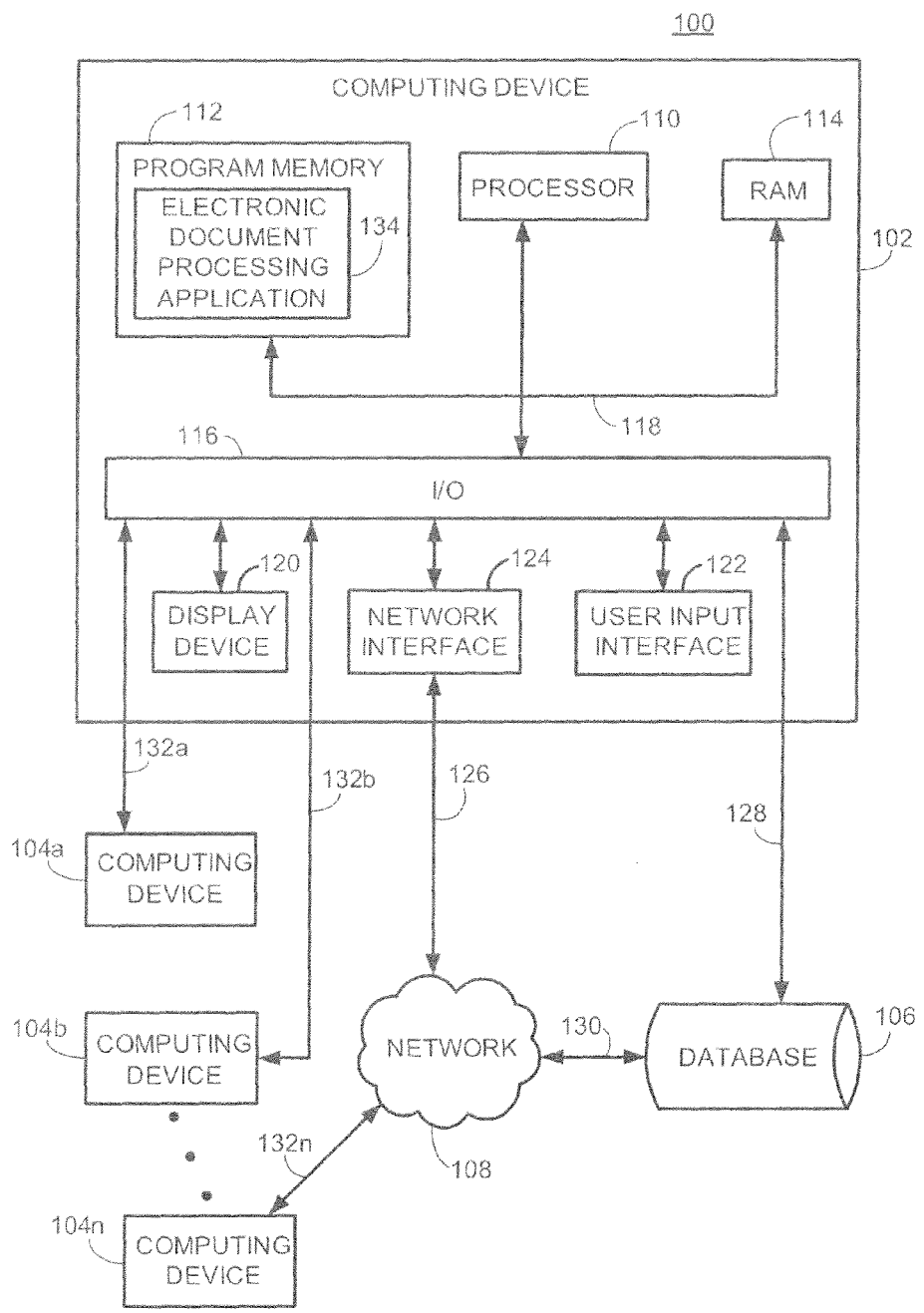
FIG. 1 is a block diagram of an example system for processing electronic documents, according to various embodiments.

FIG. 1 is a block diagram of an example system 100 for processing electronic documents, according to various embodiments of the present invention. The example system 100 includes a computing device 102, a plurality of additional computing devices 104a-104n, a database 106, and a network 108. The computing device 102 may be owned by, operated by, or otherwise accessible to an organization, and the organization may be engaged in, for example, technology reselling and/or technology consulting. The computing device 102 may serve as a user interface for processing electronic documents such as, but not limited to, Statements of Work (SOWs). In some embodiments, the computing device 102, and/or one or more of the computing devices 104a-104n, may be any suitable electronic device or devices, including but not limited to a laptop computer, desktop computer, personal digital assistant, cellular telephone, other wireless device, etc.

For the sake of simplicity, a simplified block diagram of the computing device 102 is shown in FIG. 1. The computing device 102 may include a processor 110 (which may also be referred to as a microcontroller or a microprocessor) for executing computer executable instructions, a program memory 112 for permanently storing data related to the computer executable instructions, a random-access memory (RAM) 114 for temporarily storing data related to the computer executable instructions, such as data associated with execution of the computer executable instructions, and an input/output (I/O) circuit 116, all of which may be interconnected via an address/data bus 118.

It should be appreciated that although only one processor 110 is shown, the computing device 102 may include multiple processors 110. Additionally or alternatively, the processor(s) 110 may be a multi-core processor(s). Similarly, the memory of the computing device 102 may include multiple RAMs 114 and/or multiple program memories 112. The RAM(s) 114 and program memory(ies) 112 may be implemented as semiconductor memories, magnetically readable memories, optically readable memories, and/or other tangible, non-transitory computer-readable media, for example. Additionally, although the I/O circuit 116 is shown as a single block, it should be appreciated that the I/O circuit 116 may include a number of different types of I/O circuits. For example, a first I/O circuit may correspond to a display device 120 of the computing device 102, and the first or a second I/O circuit may correspond to a user input/output interface 122 of the computing device 102. The user input/output interface 122 may be or may include, for example, a keyboard, a mouse, a touch screen, a voice activation device, or any other known or later-developed user input/output interface device. In some embodiments, the display device 120 and the user input/output interface 122 may be jointly incorporated in a single physical device. The computing device 102 may also include other elements common to general purpose computing devices.

The computing device 102 may be operatively connected to the network 108 via a network interface 124 and a link 126. The network 108 may be or may include a private network, a public network, or some combination of the two. At least a portion of the network 108 may be privately administered by the organization and may be firewalled from public networks. The network 108 may be or may include a client-server network, a peer-to-peer network, an Ethernet network, a cloud computing network, or any other known type of network in which computing devices are enabled to communicate. In some embodiments, the network 108 may include more than one network and/or portions of more than one network, including more than one different type of network.

The link 126 may be as simple as a memory access function or an Ethernet connection, and/or the link 126 may be a wired, wireless, or multi-stage connection. Many types of links are known in the art of networking and may be used in conjunction with the computing device 102. In some embodiments, while not shown as such in FIG. 1, at least one of the display device 120 or the user input/output interface 122 may be remotely connected to the computing device 102 using the network 108 and the link 126.

The processor 110 may be operatively connected to the database 106 via the I/O circuit 116 and a link 128. Similar to the link 126, the link 128 may be any type of link known in the art. In some embodiments, the link 128 may be the same link as the link 126, and the processor 110 may access the database 106 via the network 108, such as via a link 130. The database 106 may store or provide space for the eventual storage of one or more of electronic source documents, electronic destination documents, or electronic processing templates that indicate particular source document content for which each of a plurality of electronic source documents is to be searched and one or more processing actions that are to be performed with respect to such particular source document content. Electronic processing templates, electronic source documents, and electronic destination documents are each discussed in greater detail below. Data other than electronic source documents, electronic destination documents, or electronic processing templates may also be stored in the database 106, in some embodiments. The database 106 may be any suitable type of database or data storage entity. In some embodiments, the database 106 may be entirely or partially contained within the computing device 102 and/or one or more of the computing devices 104a-104n. For example, the database 106 may be included in the program memory 112 of the computing device 102. In some embodiments, the database 106 may be a multiplicity of databases or data storage entities.

The computing device 102 may be in communicative connection with the additional computing devices 104a-104n via links 132a-132n. Some or all of the links 132a-132n may be direct links between the computing device 102 and one or more respective ones of the computing devices 104a-104n. Additionally or alternatively, some or all of the links 132a-132n may be in communicative connection with the computing device 102 via the network 108. For example, a computing device 104a may be a computing device at another office of the organization. A computing device 104b may provide access to one or more additional databases (not shown). The computing devices 104a and 104b may, but need not, be directly coupled to the computing device 102 via the links 132a and 132b. On the other hand, a computing device 104n may be a server that hosts applications for access by other computing devices of the organization (e.g., the computing devices 102, 104a, and 104b). The computing device 104n may, but need not, be communicatively coupled to the computing device 102 via the network 108. In particular, the computing device 104n may be communicatively coupled to the computing device 102 via the link 32n, the network 108, and the link 126. Further, although not illustrated as such, the computing devices 104a-104n may each also include elements typically found in general purpose computing devices and similar to the computing device 102, such as a program memory, a processor, a RAM, a bus, a display, a user input/output interface, a network interface, and other elements.

One or more sets of computer-executable instructions constituting an electronic document processing application 134 may be stored in the program memory 112. As used herein, the terms "computer-executable instructions," "computer executable instructions," "instructions" and the like are interchangeable. The electronic document processing application 134 may include one or more computer programs or portion(s) or routine(s) thereof. The electronic document processing application 134 may be executable by the processor 110 in order to process electronic documents, as further described below. In some embodiments, the electronic document processing application 134 may be a web-based application, and one of the computing devices 104a-104n may be a web server (e.g., the computing device 104n) that executes the computer-executable instructions constituting the electronic document processing application 134 and that communicates with the computing device 102 to present an interactive web page to a user. In this way, the user is able to use the electronic document processing application 134 to process electronic documents via the computing device 102.

Further, in some embodiments, all or a portion of the electronic document processing application 134 may be stored in memory of one or more of the computing devices 104a-104n. Still further, in some embodiments, the electronic document processing application 134 may be executed by more than one of the computing devices 102 and 104a-104n. That is, different ones of the computing devices 102 and 104a-104n may execute different portions of the computer-executable instructions constituting the electronic document processing application 134. For example, the computing device 102 and the computing device 104n may each execute a portion of the computer-executable instructions constituting the electronic document processing application 134. As another example, the computing device 104a and the computing device 104n may each execute a portion of the computer-executable instructions constituting the electronic document processing application 134, and one or both of the computing devices 104a or 104n may communicate with the computing device 102 to present an interactive web page to a user of the computing device 102, as described above.

In view of the numerous ways that the electronic document processing application 134 may be stored and/or executed, it is noted that various examples in the present disclosure describe the computer-executable instructions constituting the electronic document processing application 134 as being stored in and executed by the computing device 102. Such examples are presented merely for simplicity and ease of explanation, and it will be understood that various principles of the present disclosure may be correspondingly applied to cases in which the electronic document processing application 134 is not wholly stored in and/or executed by the computing device 102.

Figure 2:
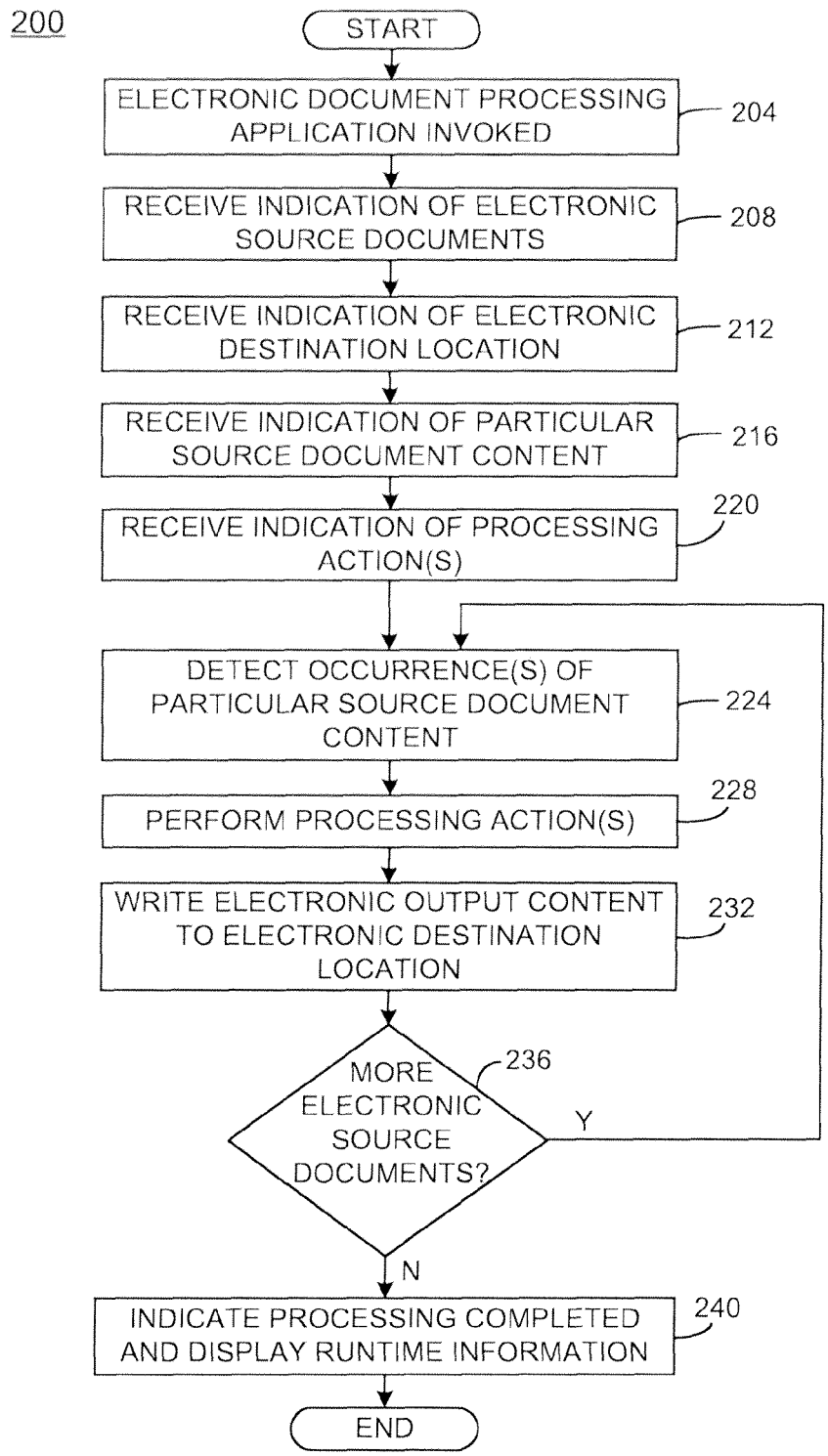
FIG. 2 is a flow chart of an example method for processing electronic documents, according to various embodiments.

FIG. 2 is a flow chart of an example method 200 for processing electronic documents, according to various embodiments of the present invention. For ease of explanation, the method 200 will be described with reference to the system 100 of FIG. 1. However, it will be understood that the method 200 may be implemented using a system other than the system 100. It will be further understood that in at least some embodiments, FIG. 2 represents one or more portions or routines of one or more computer programs used in implementing the electronic document processing application 134. The software may be written at any high-level language such as Visual Basic, C, C++, C#, Java or the like, or any low-level assembly or machine language. By storing the computer program portion(s) or routine(s) or computer-executable instructions therein, those portions of the program memory 112 (or other memory(ies)) are physically and/or structurally configured in accordance with the stored program portion(s) or routine(s) or instructions. Parts of the software may be stored and run in one or more other memory locations if desired.

Figure 3:
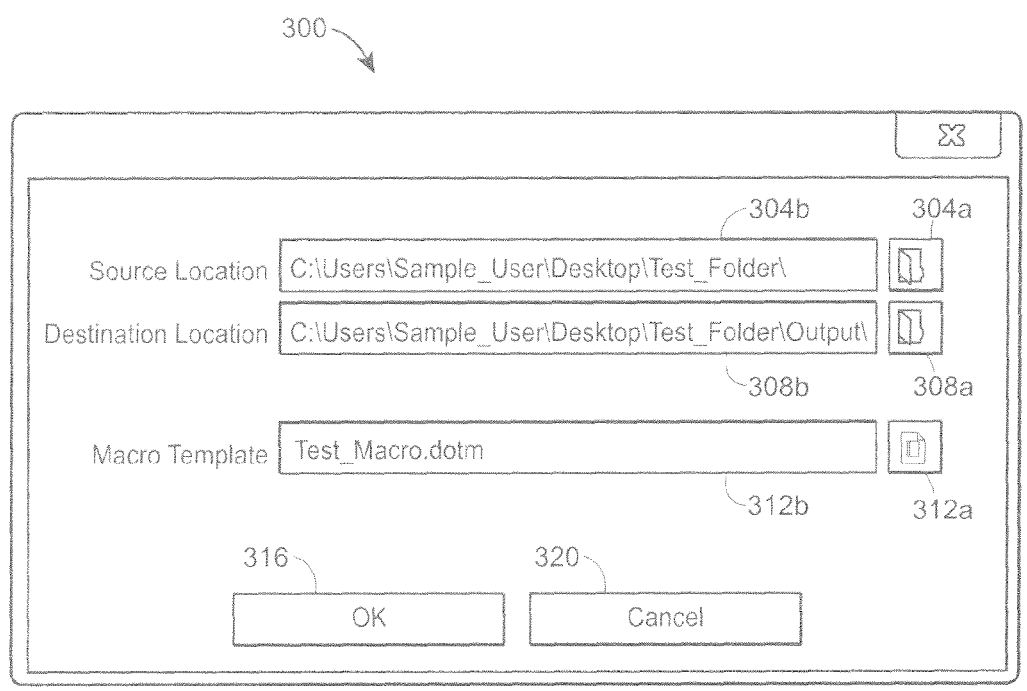
FIG. 3 is a screenshot of an example main screen of an electronic document processing application, according to various embodiments.

The method 200 may begin when the electronic document processing application 134 is invoked (block 204). The electronic document processing application 134 may be invoked by a user of the computing device 102, such as by delivering one or more suitable input commands to the computing device 102 via the user input/output interface 122. When the electronic document processing application 134 is invoked, the electronic document processing application 134 may cause the computing device 102 to display, via the display device 120, a main screen of the electronic document processing application 134. FIG. 3 is a screenshot of an example main screen 300. The main screen 300 may include an electronic source location selection icon 304a, an electronic source location indication field 304b, an electronic destination location selection icon 308a, an electronic destination location indication field 308b, an electronic processing template selection icon 312a, an electronic processing template indication field 312b, an electronic processing start icon 316, and an electronic processing cancellation icon 320.

Figure 4:
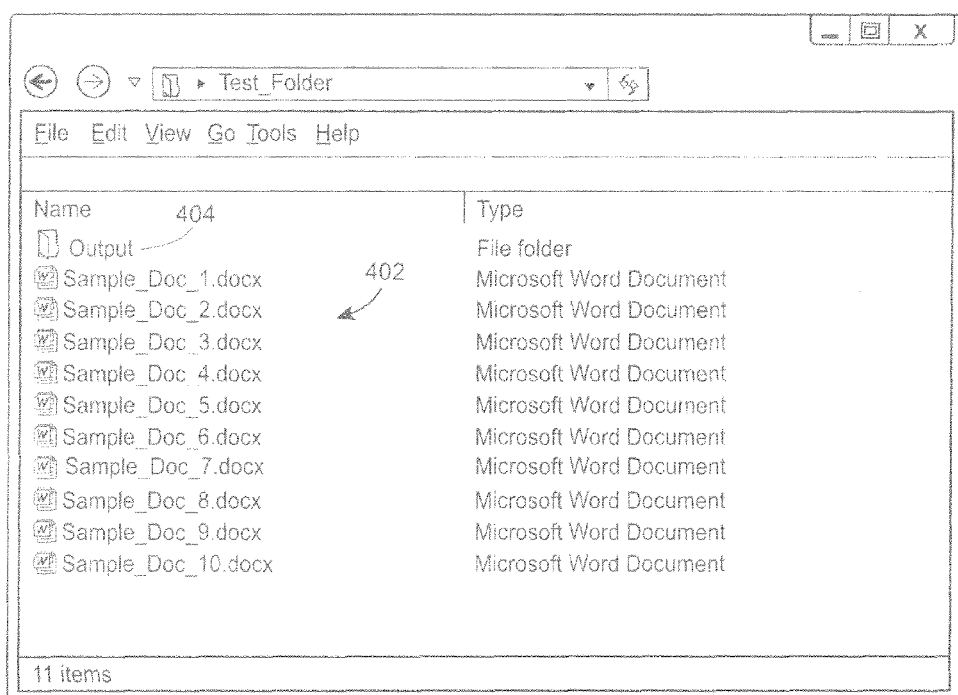
FIG. 4 is a screenshot representing an example electronic source location containing a plurality of electronic source documents that are to be processed by an electronic document processing application, according to various embodiments.

Upon selection of the electronic source location selection icon 304a, the computing device 102 may present representations of one or more electronic file directories to the user via the display device 120. The electronic file directories may include, for example, electronic documents stored in the database 106 and/or the program memory 112. The user may navigate through the one or more electronic file directories to select an electronic source location (e.g., a particular folder) that contains a plurality of electronic source documents that are to be processed with the electronic document processing application 134. In this manner, the electronic document processing application 134 may receive an indication of the plurality of electronic source documents that are to be processed with the electronic document processing application 134 (block 208). The electronic document processing application 134 may then cause a path name for the selected electronic source location (e.g., the particular selected folder) to be inserted into the electronic source location indication field 304b. For example, FIG. 3 shows that the path name for the folder that constitutes an example electronic source location is C:\Users\Sample_User\Desktop\Test_Folder\. FIG. 4 is a screenshot representing an example electronic source location 400, which may be the electronic source location C:\Users\Sample_User\Desktop\Test_Folder\ that is indicated in FIG. 3. FIG. 4 shows that the electronic source location 400 includes, for example, a plurality of electronic source documents 402.

Continuing as to the method 200, the electronic document processing application 134 may receive an indication of an electronic destination location to which electronic output content is to be written after the electronic document processing application 134 processes the plurality of electronic source documents (block 212). In some embodiments, the electronic document processing application 134 may cause the display device 120 to present representations of one or more electronic file directories to the user upon selection of the electronic destination location selection icon 308a. The user may then select the electronic destination location (e.g., a particular folder). If desired, the electronic document processing application 134 may cause a corresponding path name to be inserted into the electronic destination location indication field 308b. For example, FIG. 3 shows that the path name for a folder that constitutes an example electronic destination location is C:\Users\Sample_User\Desktop\Test_Folder\Output. That is, in the particular example of FIG. 3, the electronic destination location is a folder named "Output" that is located within the folder named "Test_Folder" that constitutes the electronic source location. Correspondingly, FIG. 4 shows the electronic source location 400 as including a folder 404 named "Output."

Figure 5:
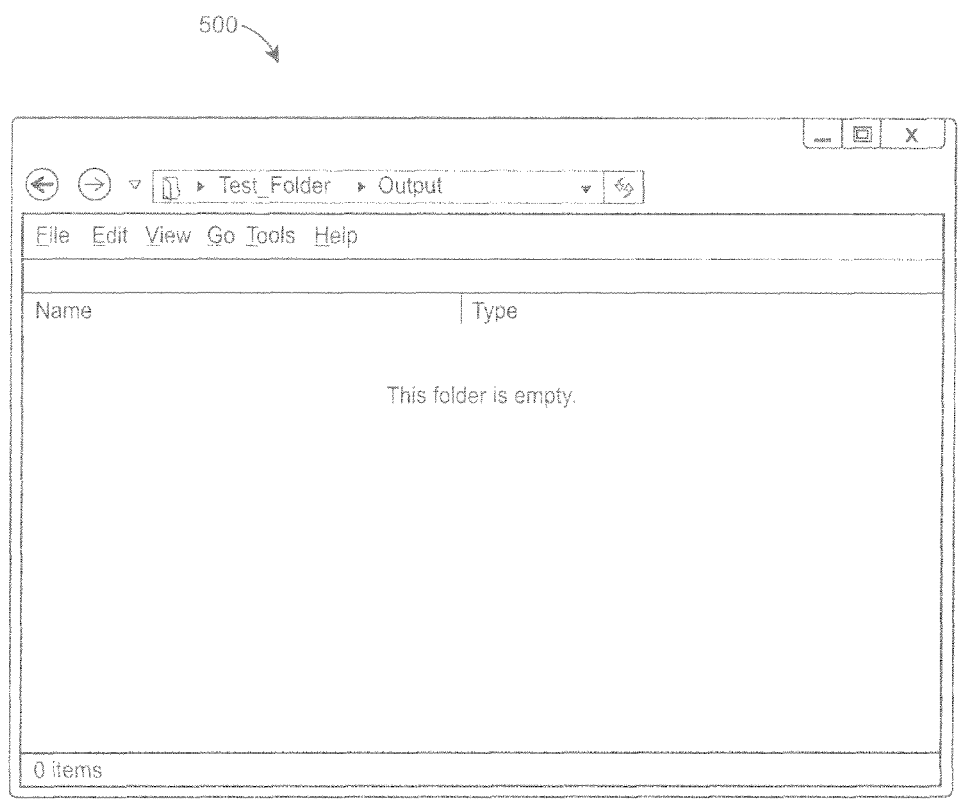
FIG. 5 is a screenshot representing an example electronic destination location prior to processing of a plurality of electronic source documents, according to various embodiments.

In other embodiments, the electronic destination location need not be located within the electronic source location. In still other embodiments, the electronic destination location may be the same as the electronic source location. That is, the user may use the selection icons 304a and 308a to select the same folder to be both the electronic source location and the electronic destination location, and this may cause the electronic document processing application 134 to overwrite all or a portion of the contents of the plurality of electronic source documents with the electronic output content. Moreover, in some embodiments, the electronic destination location already includes electronic documents prior to processing of the plurality of electronic source documents. In other embodiments, the electronic destination location does not include any electronic documents prior to processing of the plurality of electronic source documents. For example, FIG. 5 is a screenshot representing an example electronic destination location 500 prior to processing of a plurality of electronic source documents, which may be the electronic destination location C:\Users\Sample_User\Desktop\Test_Folder\Output that is indicated in FIG. 3. In the example of FIG. 5, the example electronic destination location 500 is empty prior to processing of the plurality of electronic source documents. As will be understood in light of the description below, the processing of the plurality of electronic source documents may result in the generation of electronic output content that will be written to the electronic destination location 500.

The electronic document processing application 134 may also receive an indication of particular source document content for which the electronic document processing application 134 is to search each of the plurality of electronic source documents (block 216). In some cases, the function described by the block 216 may receive an indication that the electronic document processing application 134 is to search each of the plurality of electronic source documents for any one or more of multiple different content elements. In some embodiments, an occurrence of any of the multiple different content elements may be considered an occurrence of the particular source document content, and may be detected as such, as further described below.

Such multiple content elements may be expected variations of the same content, such as variations in the way a customer's name is abbreviated. In other cases, such multiple content elements may be more distinct. This allows the electronic document processing application 134 to search for, and later process, distinct contents of electronic documents without having to receive multiple indications of the distinct contents from a user of the computing device 102. For example, the function described by the block 216 may receive, at one time, an indication that each of the plurality of electronic source documents is to be searched both for a particular customer name and for particular SOW terms and conditions regarding customer responsibilities. The SOW application 134 may then perform different processing actions with respect to each of these distinct contents. Such processing actions are described in greater detail below. As further described below, the result is that the amount of interaction required between the user and the computing device 102 is reduced.

In particular, a function described by a block 220 may receive an indication of one or more processing actions that are to be performed with respect to the particular source document content, which may or may not include multiple different content elements as described above. In some examples, the functions described by the blocks 216 and 220 may be implemented jointly. For example, the electronic document processing application 134 may receive an indication of an electronic processing template that is to be utilized in processing the plurality of electronic source documents. The user of the computing device 102 may provide this indication by selecting the electronic processing template selection icon 312a and thereafter selecting a particular electronic processing template from a plurality of available electronic processing templates. After the user selects a particular electronic processing template, the electronic document processing application 134 may cause the electronic processing template indication field 312b to be populated with the name of the selected electronic processing template. The plurality of available electronic processing templates may be stored in the program memory 112 and/or another suitable memory, such as another suitable read-only memory (ROM). In some cases, some or all of the plurality of available electronic processing templates may be stored in the database 106. Each available electronic processing template may contain computer-executable instructions that indicate corresponding particular source document content and a processing action or actions that are to be performed with respect to that particular source document content.

When executed, the computer-executable instructions of an electronic processing template may cause the processor 110 to search each of the plurality of electronic source documents for the particular source document content indicated by the instructions. In this regard, it is noted that instead of being "stand-alone" executables, the electronic document processing application 134 (and, thus, the electronic processing template) may execute within the framework of another application, such as a version of the Microsoft Word application available from Microsoft Corporation. The electronic processing template or portions thereof may be developed using the Visual Basic programming language from Microsoft Corporation. In such cases, the manner of searching of each of the plurality of electronic source documents may be specified using the Visual Basic programming language and may be performed based on the "Find" functionality provided by Microsoft Word, for example. Of course, the processor 110 may perform searching in any other suitable manner as well, including in cases where the electronic document processing application 134 is a "stand-alone" executable that is not implemented within the framework of another application.

In any event, the computer-executable instructions of the selected electronic processing template may also cause the processor 110 to perform the processing actions) with respect to the particular source document content, as further described below. In some embodiments, the computer-executable instructions may be or may include one or more macros that indicate how electronic output content is to be generated based on the particular source document content. In this regard, it is noted that an electronic processing template including one or more macros may also or alternatively be referred to herein as a "macro template." For example, FIG. 3 shows that the selected electronic processing template may be a macro template named "Test_Macro.dotm."

When an electronic processing template includes one or more macros, such macro(s) may indicate the one or more processing actions that are to be performed. For example, as discussed further below, the macro(s) may indicate that the one or more processing actions are to be performed by replacing each detected occurrence of the particular source document content in each of the plurality of electronic source documents with an occurrence of particular destination document content. The electronic document processing application 134 may then generate the electronic output content corresponding to a particular electronic source document by including, in the electronic output content, all of the same content that was found in the particular electronic source document except that each occurrence of the particular source document content will be replaced with the occurrence of the particular destination document content indicated by the macro(s). In this manner, the electronic document processing application 134 effectively converts each occurrence of the particular source document content to an occurrence of the particular destination document content. More particularly, the particular source document content may include, for example, out-of-date SOW terms and conditions that specify customer responsibilities, and the particular destination document content may include, for example, up-to-date SOW terms and conditions that specify the customer responsibilities.

In other examples, and as discussed further below, an electronic processing template (e.g., having one or more macros therein) may indicate that electronic output content corresponding to the plurality of electronic source documents is to include reporting information pertaining to the one or more occurrences of the particular source document content that are detected therein. Thus, the one or more processing actions that are to be performed with respect to the particular source document content may include generating such reporting information. For example, such macros may cause the electronic document processing application 134 to increment a count variable associated with the particular source document content. In this manner, the electronic document processing application 134 may keep track of a number of occurrences of the particular source document content within a particular one of the plurality of electronic source documents, within all of the plurality of electronic source documents, or within some subset thereof. A final count associated with the particular source document content may be obtained after the aforementioned searching of the corresponding electronic source document or documents is completed.

In some embodiments, the macro(s) causing the incrementing of the count variable may also indicate a particular electronic destination document (which may also be referred to as an electronic report document) stored in the indicated electronic destination location to which the count is to be written. In other embodiments, the macro(s) may indicate that a new electronic destination document is to be created and that the count is to be written to the new electronic destination document. In any event, the electronic destination document to which the count is written may later be accessed by the user of the computing device 102 and/or other users (including users accessing the particular electronic destination document via the network 108) so that such user(s) may quickly determine the number of occurrences of the particular source document content within the electronic source document(s) at issue. This ability may be particularly advantageous for users in assessing the prevalence of content that may need to be changed at a later time and, therefore, the degree to which such changes will affect the contents of electronic documents.

In other examples of one or more macros indicating that electronic output content is to include reporting information, one or more macros may indicate that an electronic report document is to identify each of the plurality of electronic source documents in which the particular source document content is detected. In some embodiments, such macro(s) indicating that the electronic report document is to be generated may identify a particular document already existing in the indicated electronic destination location, and the identified electronic report document will effectively be generated once appropriate reporting information is written to that particular existing document. In other embodiments, the macro(s) indicating that the electronic report document is to be generated may indicate that the electronic report document is to be created as a new electronic document in the indicated electronic destination location. In any event, the generation of an electronic report document that, for example, identifies each electronic source document in which particular source document content is detected may be especially beneficial for users in assessing the number of electronic documents that will be affected by proposed changes to document content at a later time.

Of course, the foregoing discussion of reporting information is by way of example and not limitation. Any suitable reporting information may be included in the electronic output content, according to various embodiments. As a further example, macros may indicate that the electronic document processing application 134 is to generate an electronic report document that includes an indication of each occurrence of the particular source document content in one of the plurality of electronic source documents. For example, such an indication may include one or more of the text of the occurrence of the particular source document content, an indication of the particular electronic source document in which the occurrence of the particular source document content is detected, etc. It may be desirable for the indication to include the text of the occurrence of the particular source document content when, for example, the particular source document content includes multiple different content elements as discussed above. In this way, the reporting information indicates, for each occurrence of the particular source document content, which of the multiple different content elements was detected and thus constitutes that occurrence.

In some embodiments, an electronic processing template (e.g., including macros, as discussed above) may indicate that reporting information is to be presented to a user via the display device 120 and/or other input/output devices of the user input/output interface 122. In such cases, the electronic processing template may also indicate that the reporting information is to be written to one or more electronic destination documents (electronic report documents) in the electronic destination location. The presentation of the reporting information to the user may then be accomplished by the electronic processing template causing the contents of the one or more electronic destination documents to be displayed on the display device 120 or otherwise presented via the user input/output interface 122, without the user having to make any selection to cause such presentation. In this way, the electronic destination location may be used to hold the reporting information that is then presented automatically and conveniently to the user. In some cases, the electronic processing template may also indicate a particular manner in which the reporting information is to be formatted (e.g., in a particular columnar or tabular arrangement, etc.) when the reporting information is presented to the user.

As noted above, some electronic processing templates may include more than one macro. In some embodiments, the plurality of electronic source documents may be processed by only one of the macros in the selected electronic processing template, and/or by only one macro at a time. In such cases, after the user selects the macro template using the electronic processing template selection icon 312a, the user may select the electronic processing start icon 316 (e.g., via a mouse click or other suitable selection via the user input interface 122). Upon selection of the electronic processing start icon 316, the electronic document processing application 134 may cause a macro selection screen to be presented to the user via the display device 120. The macro selection screen may prompt the user to select a particular macro within the electronic processing template (macro template) that is to be used in processing the plurality of electronic source documents. That is, the macro selection screen may prompt the user to select a particular macro that indicates the one or more processing actions that are to be performed. Upon the user's selection, the electronic document processing application 134 may receive an indication of the particular macro within the macro template that is to be used.

Figure 6:
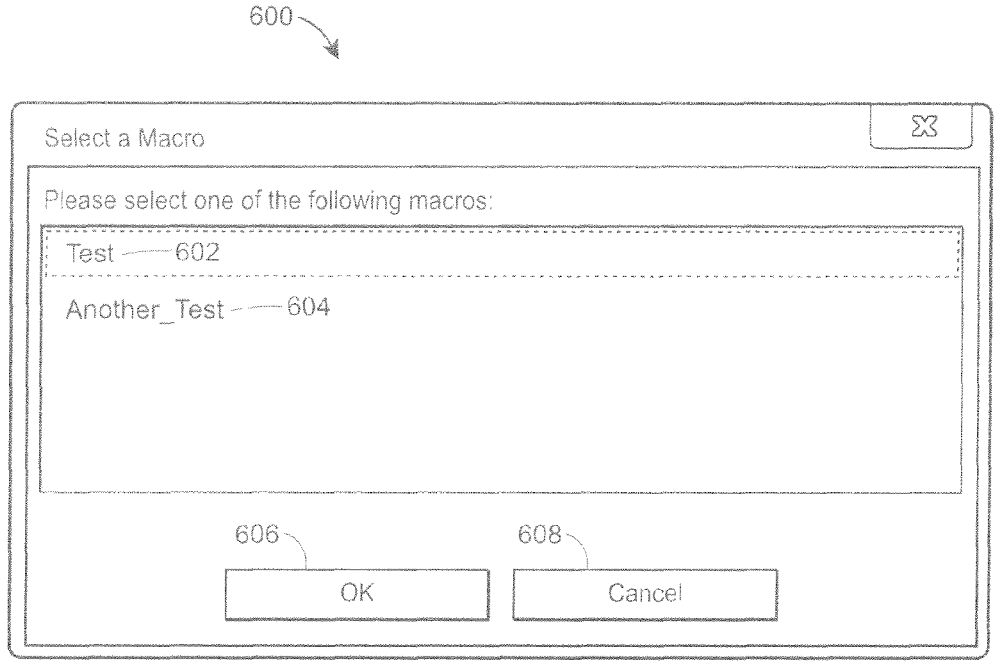
FIG. 6 is a screenshot of an example macro selection screen, according to various embodiments.

FIG. 6 is a screenshot of an example macro selection screen 600. The example macro selection screen 600 is associated with the particular electronic processing template (macro template) selected using the electronic processing template selection icon 312a. That is, the example macro selection screen 600 shows the individual macros included within the electronic processing template (macro template) named "Test_macro.dotm." The macro selection screen 600 includes an option 602 to select an individual macro named "Test" and an option 604 to select an individual macro named "Another Test." The macro named "Test" may, for example, cause one or more first processing actions to be performed when selected, whereas the macro named "Another Test" may, for example, cause one or more second processing actions to be performed when selected, where the one or more second processing actions differ from the one or more first processing actions. Moreover, while not shown in FIG. 6, additional macros may be selectable depending on the particular macro template that was selected. For example, a third macro, when selected, may cause one or more third processing actions to be performed, and so on.

In the illustrated example, the dashed outline around the option 602 indicates that the option 602 has been selected. The example macro selection screen 600 also includes a selection confirmation icon 606, which the user may select in order to confirm that the user has selected the desired one of the options 602 or 604. The example macro selection screen 600 further includes a selection cancellation icon 608, which the user may select if, for any reason, the user does not wish to process the plurality of electronic source documents either at all or with the selected macro template.

With reference back to FIG. 3, it is noted that the user may also select the electronic processing cancellation icon 320 at any time if the user does not wish to process any electronic documents, such as because the user invoked the electronic document processing application 134 by mistake. However, if the user does select a plurality of electronic source documents, an electronic destination location, an electronic processing template, and, in some cases, a particular macro therein as shown in the example macro selection screen 600, then the method 200 may continue. Thus, after the electronic document processing application 134 receives the indication of the particular source document content (block 216) and the indication of the one or more processing actions that are to be performed with respect to the particular source document content (block 220), the electronic document processing application 134 may detect one or more occurrences of the particular source document content in each one of the plurality of electronic source documents (block 224). For example, the electronic document processing application 134 may detect the one or more occurrences of the particular source document content by performing a search of each one of the plurality of electronic source documents, as discussed above.

Based on the electronic document processing application 134 detecting the one or more occurrences of the particular source document content (block 224), the electronic document processing application 134 may perform the one or more indicated processing actions with respect to the one or more occurrences of the particular source document content in each one of the plurality of electronic source documents, so as to generate the electronic output content (block 228). For example, the function described by the block 228 may convert the one or more occurrences of the particular source document content into one or more respective occurrences of particular destination document content indicated by one or more macros, as discussed above. Each of the one or more occurrences of such particular destination document content may constitute a portion of the electronic output content generated by the electronic document processing application 134, with the remaining portions of the electronic output content being unchanged from the content of the corresponding electronic source document. In other examples, the function described by the block 228 may generate reporting information pertaining to the one or more occurrences of the particular source document content, as discussed above.

In any event, when the electronic document processing application 134 receives appropriate indications of the particular source document content (block 216) and the one or more processing actions (block 220), this allows the function described by the block 228 to perform the one or more processing actions without the computing device 102 presenting contents of the plurality of electronic source documents to a user. For example, as discussed in greater detail below and as shown in FIG. 2, the function described by the block 228 (and the function described by the block 224) may be performed repeatedly, such as one time for each of the plurality of electronic source documents. In such embodiments, each time the function described by the block 228 is performed, the one or more processing actions may be performed with respect to one or more occurrences of the particular source document content in a corresponding one of the plurality of electronic source documents without the contents of the corresponding one of the plurality of electronic source documents (or the contents of any other one of the plurality of electronic source documents) being presented to the user. In this manner, the amount of user interaction with the electronic document processing application 134, and thus the potential for the user to introduce errors into the document processing procedure, is significantly reduced.

After the function described by the block 224 detects the one or more occurrences of the particular source document content and the function described by the block 228 performs the one or more indicated processing actions with respect to such occurrences, the electronic document processing application 134 may write electronic output content to the electronic destination location (block 232). For example, where the one or more processing actions include converting each detected occurrence of the particular source document content into particular destination document content indicated by one or more macros, the function described by the block 232 may write the identical content from one of the plurality of electronic source documents to the electronic destination location, except that each occurrence of the particular source document content is replaced with the particular destination document content indicated by such macros. As discussed below, and as with the functions described by the blocks 224 and 228, the function described by the block 232 may be performed repeatedly, such as one time for each of the plurality of electronic source documents. Thus, each time the function described by the block 232 is performed, a portion of the electronic output content that corresponds to one of the plurality of electronic source documents may be written to the electronic destination location.

In at least some cases, the functions described by the blocks 224, 228, and 232 may be performed during overlapping intervals of time. For example, as the function described by the block 224 begins to detect the one or more occurrences of the particular source document content, the function described by the block 228 may begin to perform the one or more indicated processing actions with respect to such occurrences, and in some cases the function described by the block 232 may begin to write corresponding electronic output content to the electronic destination location.

Additionally, as discussed above, the functions described by the blocks 224, 228, and 232 may be performed repeatedly, such as one time each for each of the plurality of electronic source documents. Thus, in some embodiments, after the function described by the block 232 writes electronic output content corresponding to a particular electronic source document to the electronic destination location, a function described by a block 236 may determine whether more of the plurality of electronic source documents remain to be processed. If it is determined (block 236) that one or more of the plurality of electronic source documents remain to be processed, the flow of the method 200 may return to the function described by the block 224, and processing of a next one of the plurality of electronic source documents may continue in the manner generally described above.

During processing of the plurality of electronic source documents, the electronic document processing application 134 may cause one or more suitable progress indicators to be presented to the user via, for example, the display device 120. In this manner, the user may ascertain the progress of the processing even though the user is not presented with, and need not interact with, the contents of the plurality of electronic source documents during the processing thereof.

Figure 7A:
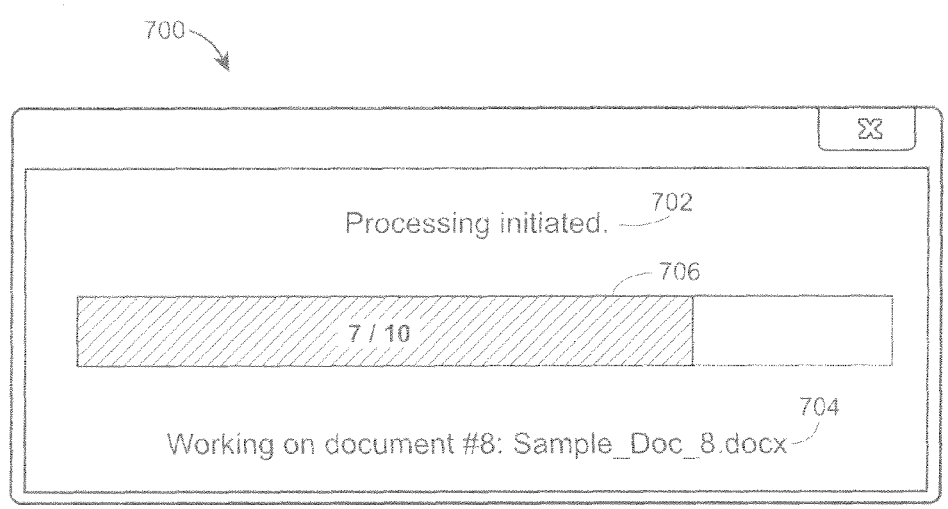
FIG. 7A is a screenshot of an example in-progress indicator screen, according to various embodiments.

In particular, FIG. 7A is a screenshot of an example in-progress indicator screen 700. The in-progress indicator screen 700 includes a message 702 that informs the user that processing of the plurality of electronic source documents has been initiated. The in-progress indicator screen 700 also includes a current electronic source document indicator 704 that informs the user of which electronic source document is currently being processed (in the example of FIG. 7A, the eighth electronic source document), and shows the name of the electronic source document that is currently being processed. Still further, the in-progress indicator screen 700 includes an amount of completion indicator 706 that informs the user of how many electronic source documents have already been processed (in the example of FIG. 7A, seven electronic source documents out of a total of ten). The amount of completion indicator 706 is shown as a partially-filled progress bar, but may be any suitable type of indicator. For example, the amount of completion indicator 706 may instead be an hourglass, a pie chart, etc.

If, on the other hand, it is determined (block 236) that none of the plurality of electronic source documents remain to be processed because all of the plurality of electronic source documents have already been processed, the flow of the method 200 may proceed to a function described by a block 240. The electronic document processing application 134 may then perform the function described by the block 240 to indicate that processing of the plurality of electronic source documents is completed and, in some cases, to display or otherwise present runtime information to the user.

Figure 7B:
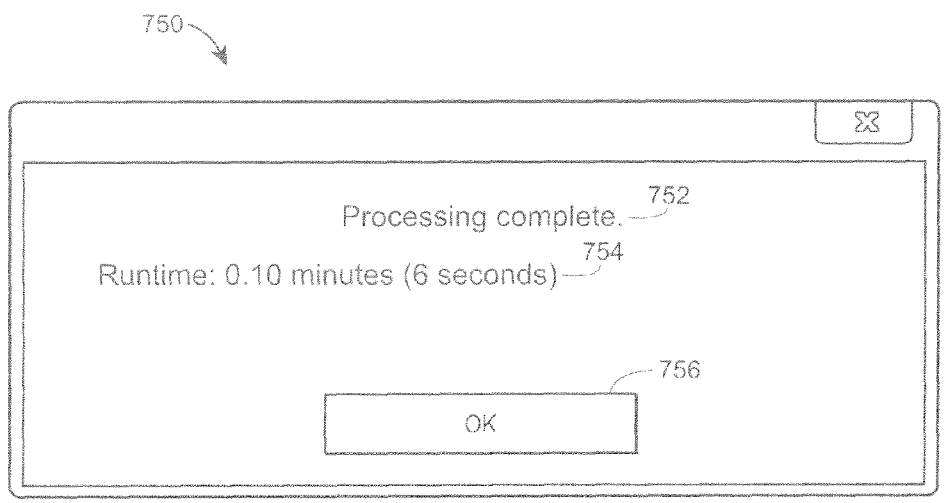
FIG. 7B is a screenshot of an example progress completed indicator screen, according to various embodiments.

For example, FIG. 7B is a screenshot of an example progress completed indicator screen 750 that the electronic document processing application 134 may cause to be displayed to the user via, for example, the display device 120 (block 240). The progress completed indicator screen 750 includes a message 752 that informs the user that processing of the plurality of electronic source documents has been completed. The progress completed indicator screen 750 also includes a message 754 that informs the user of the processing runtime, i.e., how long it took for the electronic document processing application 134 to process the plurality of electronic source documents. In the illustrated example, the processing of the plurality of electronic source documents took 0.10 minutes, or 6 seconds. Further, the progress completed indicator screen 750 includes an acknowledgement icon 756. Upon review of the messages 752 and 754, the user may select the acknowledgement icon 756, and may thereby exit the electronic document processing application 134.

Figure 8:
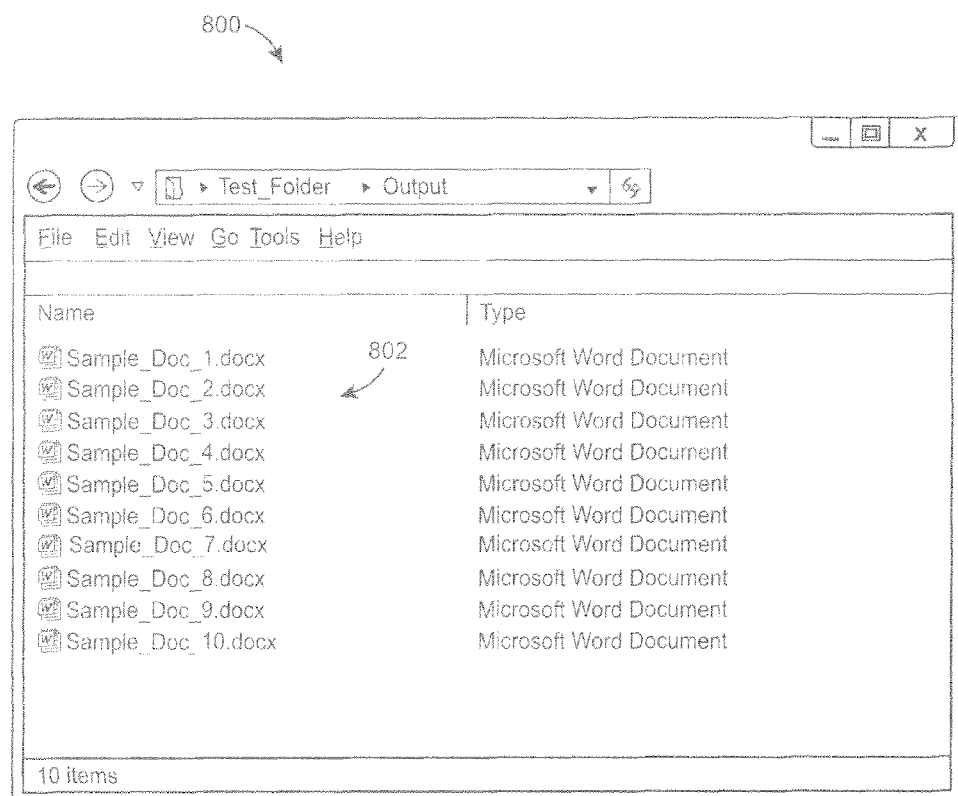
FIG. 8 is a screenshot representing an example electronic destination location after processing of a plurality of electronic source documents, according to various embodiments.

Turning now to FIG. 8, a screenshot is shown representing an example electronic destination location 800 after processing of the plurality of electronic source documents. In particular, the example electronic destination location 800 may be the electronic destination location C:\Users\Sample_User\Desktop\Test_Folder\Output that is discussed above. FIG. 8 shows that after the processing of the plurality of electronic source documents and, in particular, the implementation (in some cases repeatedly) of the functions described by the blocks 224, 228, and 232, the electronic destination location 800 includes a plurality of electronic destination documents 802, which collectively constitute the aforementioned electronic output content. In some embodiments, the function described by the block 232 may write the electronic output content to the electronic destination location such that for each of the plurality of electronic source documents, an identically named electronic destination document is generated in the electronic destination location. This is the case with respect to FIG. 8, as will be seen from a comparison of the plurality of electronic source documents 402 of FIG. 4 with the plurality of electronic destination documents 802 of FIG. 8.

Each electronic destination document may include the identical content from the corresponding identically named electronic source document except for the replacements of the particular source document content with the converted particular destination document content. In this way, the electronic document processing application 134 may revise and/or update the same or similar content elements (and, in some cases, the same or similar versions of each of multiple different content elements, as discussed above) across multiple electronic source documents without the need for repeated, time-consuming, and error-prone user interactions with the computing device 102. The electronic document processing application 134 uses the received indications of the particular source document content of interest (block 216) and the one or more processing actions that are to be performed with respect to such particular source document content (block 220) to perform extensive revisions and/or updating without the need to even present the contents of the plurality of electronic source documents to the user of the computing device 102 during the revision and/or updating processes.

In other embodiments, the function described by the block 232 may not generate an identically named electronic destination document for each of the plurality of electronic source documents. Instead, the function described by the block 232 may write the electronic output content to one electronic destination document in the electronic destination location, or to more than one electronic destination document but fewer electronic destination documents than there are electronic source documents, or to more electronic destination documents than there are electronic source documents, etc. Thus, it is noted that the electronic document processing application 134 may be used to consolidate and/or expand the contents of the plurality of electronic source documents depending upon, for example, the particular purpose(s) for which the electronic document processing application 134 is being utilized at a given time. In any event, the manner in which the plurality of electronic source documents is to be consolidated or expanded may be indicated by an electronic processing template, and an indication of that electronic processing template may be received as discussed above with respect to the functions described by the blocks 216 and 220. Of course, the functions described by the blocks 216 and 220 may be implemented in other suitable ways and, therefore, the manner in which the plurality of electronic source documents is to be consolidated or expanded may be indicated in other suitable ways as well.

Where the one or more processing actions include generating reporting information pertaining to the plurality of electronic source documents, the function described by the block 232 may write the reporting information to a pre-existing electronic destination document (or documents)

stored in the electronic destination location or to a new electronic destination document (or documents), as noted above. In such examples, depending on the particular purpose(s) for which the electronic document processing application 134 is being used, the electronic destination document may have a name that is identical or similar to one of the plurality of electronic source documents, or may have a distinct name indicating that the electronic destination document contains (or is to contain) reporting information.

Of course, the foregoing description of the method 200 is by way of example, and various suitable modifications may be made. For example, in some embodiments, the user may select a particular operating mode in which the electronic document processing application 134 is to operate. The electronic document processing application 134 may, for example, be configured to operate in (execute in) one of a first operating mode or a second operating mode. The first operating mode may, for example, correspond to converting particular source document content to particular content in one or more identically-named destination documents, as discussed above. The second operating mode may correspond to the generation of reporting information pertaining to the plurality of electronic source documents. The user may select the first operating mode or the second operating mode using, for example, the user/input output interface 122.

When the user selects the first operating mode, the electronic document processing application 134 may receive an indication of the user's selection and may determine which ones of all the available electronic processing templates correspond to converting particular source document content and which ones of the available electronic processing templates correspond to generating reporting information. The electronic document processing application 134 may then cause only the electronic processing templates that correspond to converting particular source document content to be presented to the user (e.g., via the display device 120) when the user selects the electronic processing template selection icon 312*a*.

Alternatively, all of the available electronic processing templates may correspond to converting particular source document content, and the reporting information that is to be generated in the second mode of operation may be pre-specified. For example, such reporting information may be the same regardless of the identities of the plurality of electronic source documents, or such reporting information may depend upon the particular electronic source documents selected by the user. In the latter case, the reporting information that is to be generated for particular electronic source documents may be stored in association with the particular electronic source documents, either in one or more of the databases 106*a*-106*n* or in another suitable memory or memories (which may be within the computing device 102). Thus, in this example, none of the electronic processing templates may correspond to generating reporting information. In any event, once the user selects one of the presented electronic processing templates, the method 200 may proceed in the manner described above.

On the other hand, when the user selects the second operating mode, the electronic document processing application 134 may, in some embodiments, make a similar determination of which available electronic processing templates correspond to generating reporting information and may present only those templates to the user upon selection of the electronic processing template selection icon 312*a*. In examples where all of the available electronic processing templates correspond to converting particular source document content, then when the user selects the second operating mode, the electronic document processing application 134 may not allow the user to select an electronic processing template. Instead, once the user selects the electronic processing start icon 316, the electronic document processing application 134 will begin processing the plurality of electronic source documents so as to generate reporting information that is, for example, pre-specified in one of the example manners described above.

In some cases, when the user selects the second operating mode, the electronic document processing application 134 will also or alternatively not allow the user to select an electronic destination location. This may be the case when, for example, the electronic destination location for reporting information is set in advance by the electronic document processing application, by an electronic processing template selected by the user (if the user is allowed to do so), or otherwise pre-determined.

Alternatively, when the user selects the second operating mode, the electronic document processing application 134 may allow the user to select an electronic destination location using the electronic destination location selection icon 308*a*, but the electronic document processing application 134 may simply save unaltered copies of each of the plurality of electronic source documents to the selected electronic destination location. The reporting information may then be included in one or more other electronic destination documents that may be generated in another electronic destination location. This other electronic destination location may already be determined and may be independent of a user selection made using the electronic destination location selection icon 308*a*. In some embodiments, as noted above, the reporting information may be written to such other electronic destination location in order to allow that reporting information to then be presented to the user via the display device 120 and/or the user input/output interface 122. In any event, once the electronic document processing template and the electronic destination location(s) are determined, the method 200 may proceed in the manner described above.

By allowing a user to select whether the electronic document processing application 134 is to operate in the first operating mode or the second operating mode, it may be made more apparent to the user that the electronic document processing application 134 may be used both to convert particular source document content into particular destination document content and to generate reporting information, among other potential uses. In some cases, these different types of uses of the electronic document processing application 134 may be less apparent to a user who is not provided with an ability to select an operating mode corresponding to each type of use and, instead, is only provided with a variety of electronic processing templates that are used to implement these different types of uses. That is, some users may be unaware that the electronic document processing templates can be used in such different ways. On the other hand, if the reporting information that is to be generated in the second mode of operation is pre-specified, for example, this may in some cases be less preferable than providing a user with multiple electronic processing templates that cause the electronic document processing application 134 to generate different types of reporting information, as discussed above. In some embodiments, the electronic document processing application 134 may allow the option to select the first operating mode or the second operating mode to be enabled and disabled as desired in order to accommodate different types of users and/or use scenarios.

One of ordinary skill in the art will recognize still further suitable variations of the example method 200 in light of the teaching and disclosure herein. For example, in some embodiments, the function(s) described by one or more blocks or portions of blocks shown in FIG. 2 may not be performed, and/or one or more additional functions described by one or more additional blocks not shown in FIG. 2 may be performed. In other examples, the order shown in FIG. 2 does not indicate the order in which the method 200 must be performed, and/or does not indicate that each function described by a block must be completed before another function described by another block begins.

Figure 9:
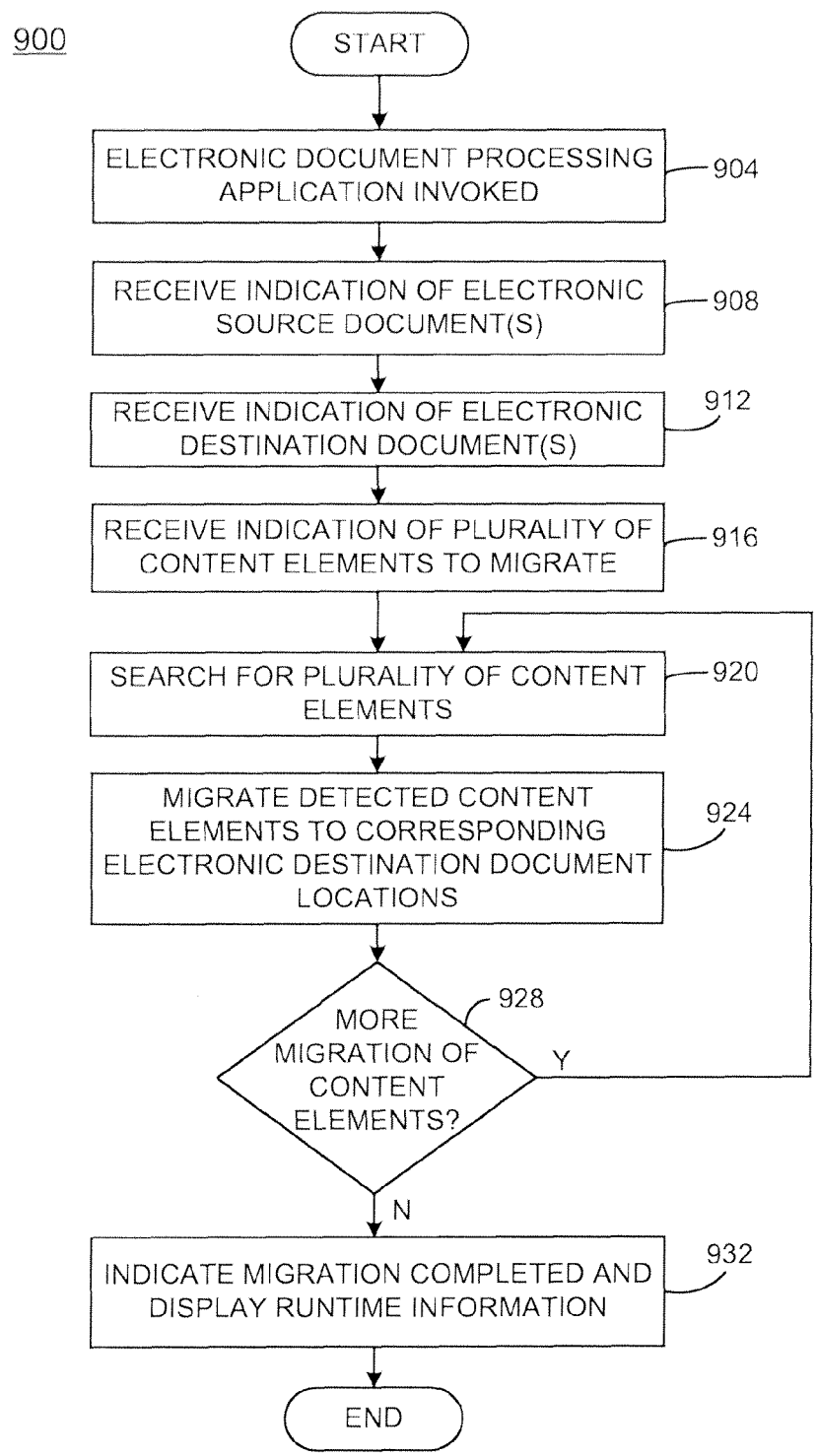
FIG. 9 is a flow chart of an example method for migrating contents of one or more electronic documents, according to various embodiments.

FIG. 9 is a flow chart of an example method 900 for migrating contents of one or more electronic documents, according to various embodiments. For ease of explanation, the method 900 will be described with reference to the system 100 of FIG. 1 and, at times, the method 200 of FIG. 2. In some cases, as will be understood from the following description, the method 900 may be a more particular way of implementing the method 200. However, it will be understood that the method 900 may be implemented using a system other than the system 100, and that the method 900 in some cases may not be a more particular way of implementing the method 200. In addition, it will be understood that in some embodiments, FIG. 9 represents one or more portions or routines of one or more computer programs used in implementing the electronic document processing application 134.

As with the method 200, the method 900 may begin when the electronic document processing application 134 is invoked (block 904). The method 900 may also include receiving an indication of one or more electronic source documents (block 908) and an indication of one or more electronic destination documents (block 912). These indications may be received in any suitable manner, such as in a manner similar to that discussed with respect to the functions described by the blocks 208 and 212.

The method 900 may further include receiving an indication of a plurality of content elements that the electronic document processing application 134 is to migrate from the one or more electronic source documents to one or more electronic destination documents (block 916). This indication may be received in any suitable manner, such as in a manner similar to that discussed with respect to the function described by the block 216. Thus, in some embodiments, the function described by the block 916 may receive an indication of an electronic processing template via a user selection of the electronic processing template selection icon 312a. The indicated electronic processing template may, in turn, indicate the plurality of content elements that the user wishes to migrate.

In some embodiments, the plurality of content elements that the user wishes to migrate may be a plurality of content "building blocks" for one or more SOWs. For example, the one or more electronic source documents may include a "master" SOW template, and the plurality of building blocks may be included within the master SOW template. One or more subordinate SOW templates may be created from the master SOW template, where each subordinate SOW template includes a subset of the building blocks in the master SOW template. Each building block may include content that is particularly likely to be useful in SOWs for one or more types of projects, and each subordinate SOW template may correspond to a different type or types of project(s). For example, one or more subordinate SOW templates may correspond to site surveys, another one or more subordinate SOW templates may correspond to deployments, etc.

In some cases, an organization may wish to migrate its master SOW template and, as a result, some or all of its subordinate SOW templates, from one format to another. Such migration may include moving (migrating) particular building blocks from an old version of the master SOW template to a new version of the master SOW template (e.g., a new version having a new format). The contents of each particular building block that is migrated may or may not be changed during the migration. Other building blocks from the old version of the master SOW template may not be migrated to the new version of the master SOW template because, for example, such building blocks may be "standard" building blocks for which corresponding building blocks are already available for inclusion in the new version of the master SOW template. In some cases, standard building blocks in a new format may be inserted into the new version of the master SOW template after the migration of other, non-standard building blocks from the old version of the master SOW template. In these cases, the new version of the master SOW template may, if desired, be created during the migration of the non-standard building blocks, as opposed to being created in advance of the migration.

In other cases, standard building blocks in the new format may be inserted into the new version prior to the migration of other, non-standard building blocks from the old version. Such other, non-standard building blocks may then be migrated from the old version into the new version that already contains the standard building blocks in the new format. Standard building blocks from the old version of the master SOW template may be effectively discarded by not being migrated to the new version of the master SOW template.

In other embodiments, the one or more electronic source documents may instead include one or more subordinate SOW templates such as those discussed above. In these cases, the method 900 may be used to directly migrate each of the one or more subordinate SOW templates from one format to another, without performing the migration of subordinate SOW templates by migrating the master SOW template. This implementation may be desirable when a building block (or blocks) in the master SOW template is present in multiple subordinate SOW templates, but a user only wishes to migrate the building block to a new format in some of those subordinate SOW templates. In still other embodiments, the one or more electronic source documents may include one or more SOWs that have already been created from one or more respective SOW templates. The method 900 may migrate such SOWs from one format to another by migrating particular building blocks therein in a similar manner as is described with respect to SOW templates.

In any event, the method 900 may thus include searching each of the one or more electronic source documents for any of the plurality of indicated content elements (block 920). The searching of the electronic source document(s) may be performed in any suitable manner, as is the case with the method 200 discussed above. For example, the searching may be performed based on the "Find" functionality provided by the Microsoft Word application available from Microsoft Corporation. Analogous to the method 200, and as shown in FIG. 9 and further discussed below, the function described by the block 920 may be performed repeatedly if contents of more than one electronic source document are to be migrated.

When one or more occurrences of one or more of the plurality of indicated content elements (e.g., building blocks) are detected, those detected ones of the content elements may be migrated to corresponding locations in one or more electronic destination documents (block 924). In some embodiments, the detected ones of the content elements are migrated to a single electronic destination document, which may be a new version of a master SOW template (e.g., in a new format). In some embodiments, and as shown in FIG. 9, in the case of content elements being migrated to multiple electronic destination documents and/or in the case of content elements being migrated from multiple electronic source documents, the function described by the block 924 may be performed repeatedly, such as one time for each migration of content elements between a particular electronic source document and a particular electronic destination document. Furthermore, in some embodiments, the detected ones of the content elements are migrated to the single electronic destination document from a single electronic source document, which may be an old version of the master SOW template (e.g., in an old format).

As a more particular example, SOW building blocks pertaining to a project description section of a SOW may be grouped in particular locations of the old version of the master SOW template. The indicated electronic processing template (block 916) may cause the migrated SOW building blocks pertaining to the project description section to be included in corresponding locations of the new version of the master SOW template. For example, the indicated electronic processing template may include instructions that cause the electronic document processing application 134 to utilize metadata or another suitable indication of the locations of such building blocks relative to the locations of other content within the old version. Based on such metadata, for example, the function described by the block 924 may migrate the building blocks to corresponding locations of the new version of the master SOW template.

Generally speaking, the location in the new version of the master SOW template that corresponds to a location in the old version of the master SOW template may be, according to various embodiments, the same graphical location, a graphical location that is the same relative to some other content but different on an overall scale, etc. For example, the old version of the master SOW template may include a plurality of sections that each, generally speaking, occupy a particular vertical portion of the old version of the master SOW template. In particular, the project description section may be the second section from the top of the old version of the master SOW template when viewed graphically with the display device 120, for example. A fee information subsection of the project description section may be the second subsection from the top of the project description section. The organization may wish to change the structure of its master SOW template as part of the migration, such that the project description section may be the topmost section of the new version of the master SOW template instead of being second from the top. However, the fee information subsection may still be the second subsection from the top of that project description section. Accordingly, in this example, metadata in the new version of the master SOW template may indicate that the location in the new version that corresponds to the location of the fee information subsection in the old version is the second subsection from the top of the topmost section of the new version.

The function described by the block 924 may migrate the detected building blocks (or any suitable detected content elements) to the new version of the master SOW template (or any suitable electronic destination document(s)) in a manner similar to that discussed above with respect to the writing of electronic output to an electronic destination location (e.g., block 232). For example, as noted above, the function described by the block 924 may create the new version of the master SOW template during the migration, or the new version may already exist prior to the migration. Moreover, the function described by the block 924 may or may not modify the detected building blocks when migrating them to the new version of the master SOW template. If the function described by the block 924 does not modify the detected building blocks, the method 900 may effectively be used to migrate non-standard building blocks that are not otherwise accounted for and inserted into the new version of the master SOW template. Thus, for example, the organization may maintain a relatively static repository of standard building blocks that are not changed during migrations between versions of a master SOW template, and the method 900 may operate to migrate those building blocks that are not among the standard ones in the repository.

Alternatively, the function described by the block 924 may modify one or more of the detected building blocks to include, for example, updated content specified by the organization. In such cases, the modification of the one or more building blocks may be performed in a manner similar to that described with respect to the performing of the one or more processing actions in the method 200 (e.g., block 228). In any event, the modification or lack thereof of one or more building blocks may be controlled by a particular electronic processing template used to perform the migration and selected by the user (e.g., block 916). In some cases, only a single electronic processing template may be available and may be used by default. Thus, the user may not be prompted to select the single electronic processing template in such cases.

As in the method 200, the function described by the block 924 may migrate the detected building blocks (or other content elements) to the new version of the master SOW template (or other one or more electronic destination documents) without presenting contents of the one or more electronic source documents to a user of the computing device 102. The electronic processing template and the other functions of the method 900 may provide all of the information needed for the function described by the block 924 to perform the migration without the need for further user involvement. Consequently, the time and effort required from the user, and the potential for user error, are significantly reduced.

For example, as discussed above, the function described by the block 924 may be performed repeatedly, such as one time for each migration of content elements between a particular electronic source document and a particular electronic destination document. In such embodiments, each time the function described by the block 924 is performed, content elements may be migrated from a particular electronic source document to a particular electronic destination document without the contents of the particular electronic source document (or contents of any other electronic source document) being presented to the user.

Because, in some embodiments, the function described by the block 920 and/or the function described by the block 924 may be performed repeatedly, the example of FIG. 9 shows that after the function described by the block 924 migrates detected content elements, a function described by a block 928 may determine whether content elements are to be migrated from any more electronic source documents and/or to any more electronic destination documents. If it is determined (block 928) that more content elements are to be migrated, then the flow of the method 900 may return to the function described by the block 920 (as shown in FIG. 9), and the function described by the block 920 may search another electronic source document for any of the plurality of indicated content elements. Alternatively, in some cases when it is determined (block 928) that more content elements are to be migrated, the flow of the method 900 may return to the function described by the block 924, such as in a situation where content elements are to be migrated from a single electronic source document to a plurality of electronic destination documents. The function described by the block 924 may then migrate a subset (or all) of the content elements from such a single electronic source document to another one of the plurality of electronic destination documents. Moreover, the electronic document processing application 134 may cause one or more suitable progress indicators to be presented to the user via, for example, the display device 120 during migration of content elements, in a manner generally analogous to that described with respect to the method 200.

If, on the other hand, it is determined (block 928) that no more migration of content elements from an electronic source document to an electronic destination document is needed because, for example, all migration of content elements has been completed, then the flow of the method 900 may proceed to a function described by a block 932. The electronic document processing application 134 may then perform the function described by the block 932 to indicate that migration of content elements is completed and, in some cases, display or otherwise present runtime information to a user. For example, the information presented to the user may be similar to the example progress completed indicator screen 750 shown in FIG. 7B and described with respect to the method 200.

As with the method 200, the foregoing description of the method 900 is by way of example and not by way of limitation. One of ordinary skill in the art will recognize suitable variations of the example method 900 in light of the teaching and disclosure herein. For example, in some embodiments, the function(s) described by one or more blocks or portions of blocks shown in FIG. 9 may not be performed, and/or one or more additional functions described by one or more additional blocks not shown in FIG. 9 may be performed. In other examples, the order shown in FIG. 9 does not indicate the order in which the method 900 must be performed, and/or does not indicate that each function described by a block must be completed before another function described by another block begins.

Moreover, although the foregoing text sets forth a detailed description of numerous different embodiments, it should be understood that the scope of this patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and system described and illustrated herein without departing from the spirit and scope of the claims. Accordingly, it should be understood that the system and methods described herein are illustrative only and are not limiting upon the scope of the claims.

What is claimed is:

1. A method for processing electronic documents, the method comprising:

receiving, with one or more computing devices each having a processor executing at least a portion of an electronic document processing application and a memory coupled to the processor to store data associated with execution of the electronic document processing application, an indication of a plurality of electronic source documents that are to be processed with the electronic document processing application;

receiving, with the one or more computing devices, an indication of whether the electronic document processing application is to operate in a first mode or a second mode;

receiving, with the one or more computing devices, an indication of an electronic destination location comprising a folder within an electronic file directory to which electronic output content is to be written as a plurality of electronic files after processing of the plurality of electronic source documents;

receiving, with the one or more computing devices, an indication of particular source document content for which each of the plurality of electronic source documents is to be searched during the processing of the plurality of electronic source documents, wherein the particular source document content includes a plurality of different content elements;

receiving, with the one or more computing devices, an indication of one or more processing actions that are to be performed with respect to the particular source document content within the plurality of electronic source documents, wherein the indication of the one or more processing actions includes an indication of an electronic processing template that includes one or more macros that indicate the one or more processing actions;

detecting, with the one or more computing devices, one or more occurrences of the particular source document content within the plurality of electronic source documents, wherein occurrences of the particular source document content include occurrence of any of the plurality of different content elements;

performing, with the one or more computing devices, the one or more processing actions with respect to the one or more occurrences of the particular source document content based on detecting the one or more occurrences of the particular source document content so as to generate the electronic output content, without the one or more computing devices presenting contents of the plurality of electronic source documents to a user of the one or more computing devices, wherein the electronic output content includes a plurality of electronic destination documents corresponding to the electronic source documents on a one-to-one basis, by:

when the received indication indicates that the electronic document processing application is to operate in the first mode, replacing each of the one or more occurrences of the particular source document content into an occurrence of particular destination document content indicated by the electronic processing template, and when the received indication indicates that the electronic document processing application is to operate in the second mode, generating reporting information with respect to the one or more occurrences of the particular source document content, the electronic output content comprising the reporting information; and writing, with the one or more computing devices, the electronic output content to the electronic destination location.

2. The method of claim 1, wherein the particular source document content comprises a multitude of sets of different content elements, wherein each set corresponds to a different electronic output content element, and wherein writing the electronic output content to the electronic destination location comprises writing, with the one or more computing devices, one or more of the electronic output content elements to one or more electronic destination documents within the electronic destination location, each of the one or more electronic destination documents corresponding to one of the plurality of electronic source documents in which the one or more computing devices detected the particular source document content.

3. The method of claim 1, wherein performing the one or more processing actions with respect to the one or more occurrences of the particular source document content comprises generating, with the one or more computing devices, reporting information pertaining to the one or more occurrences of the particular source document content, wherein the electronic output content comprises the reporting information.

4. The method of claim 3, wherein generating the reporting information pertaining to the one or more occurrences of the particular source document content comprises counting, with the one or more computing devices, the one or more occurrences of the particular source document content to generate a count associated with the particular source document content, and wherein writing the electronic output content to the electronic destination location comprises writing, with the one or more computing devices, the count associated with the particular source document content to an electronic report document within the electronic destination location.

5. The method of claim 3, wherein generating the reporting information pertaining to the one or more occurrences of the particular source document content and writing the electronic output content to the electronic destination location are performed by generating, with the one or more computing devices, an electronic report document in the electronic destination location, the electronic report document identifying each of the plurality of electronic source documents in which the one or more computing devices detected the particular source document content.

6. The method of claim 3, wherein writing the electronic output content to the electronic destination location comprises writing, with the one or more computing devices, for each of the one or more occurrences of the particular source document content, one or more respective indications of the occurrence to an electronic report document stored in the electronic destination location.

7. The method of claim 1, further comprising receiving, with the one or more computing devices, an indication of a particular one of the one or more macros that indicates the one or more processing actions that are to be performed with respect to the particular source document content.

8. The method of claim 1, wherein receiving the indication of the plurality of electronic source documents comprises receiving, with the one or more computing devices, an indication of at least one source Statement of Work (SOW) template from which content is to be migrated, and wherein receiving the indication of the electronic destination location comprises receiving, with the one or more computing devices, an indication of at least one destination SOW template to which the content is to be migrated from the source SOW template.

9. A system for processing electronic documents, the system comprising:

one or more computing devices each having a processor and a memory coupled to the processor, the processor of at least one of the one or more computing devices configured to execute an electronic document processing application, the memory of at least one of the one or more computing devices configured to store data associated with execution of the electronic document processing application, the one or more computing devices configured to:

receive an indication of whether the electronic document processing application is to operate in a first mode or a second mode;

receive an indication of a plurality of electronic source documents that are to be processed with the electronic document processing application;

receive an indication of an electronic destination location comprising a folder within an electronic file directory to which electronic output content is to be written as a plurality of electronic files after processing of the plurality of electronic source documents;

receive an indication of particular source document content for which each of the plurality of electronic source documents is to be searched during the processing of the plurality of electronic source documents, wherein the particular source document content includes a plurality of different content elements;

receive an indication of one or more processing actions that are to be performed with respect to the particular source document content within the plurality of electronic source documents, wherein the indication of the one or more processing actions includes an indication of an electronic processing template that includes one or more macros that indicate the one or more processing actions;

detect one or more occurrences of the particular source document content within the plurality of electronic source documents, wherein an occurrence of the particular source document content includes an occurrence of any of the plurality of different content elements;

perform the one or more processing actions with respect to the one or more occurrences of the particular source document content based on detection of the one or more occurrences of the particular source document content so as to generate the electronic output content, without presenting contents of the plurality of electronic source documents to a user of the one or more computing devices, wherein the electronic output content includes a plurality of electronic destination documents corresponding to the electronic source documents on a one-to-one basis, by:

when the received indication indicates that the electronic document processing application is to operate in the first mode, replacing each of the one or more occurrences of the particular source document content into an occurrence of particular destination document content indicated by the electronic processing template, and when the received indication indicates that the electronic document processing application is to operate in the second mode, generating reporting information with respect to the one or more occurrences of the particular source document content, the electronic output content comprising the reporting information; and write the electronic output content to the electronic destination location.

10. The system of claim 9, wherein the particular source document content comprises a multitude of sets of different content elements, wherein each set corresponds to a different element of the electronic output content.

11. The system of claim 10, wherein the electronic output content comprises reporting information pertaining to the one or more occurrences of the particular source document content, and wherein the one or more computing devices are configured to generate the reporting information so that the reporting information includes, for each of the one or more occurrences of the particular source document content, an indication of a particular one of the plurality of electronic source documents in which the occurrence of the particular source document content was detected.

12. The system of claim 9, wherein the electronic output content comprises all content within each of the plurality of electronic source documents except that each of the one or more occurrences of the particular source document content is replaced, within the electronic output content, by an occurrence of the particular destination document content.

13. The system of claim 9, wherein the electronic destination location comprises the plurality of electronic source documents, and wherein the one or more computing devices are configured to write the electronic output content to the electronic destination location by overwriting the contents of the plurality of electronic source documents.

14. The system of claim 9, wherein when the received indication indicates that the electronic document processing application is to operate in the second mode, the one or more computing devices are configured to present the reporting information to the user of the one or more computing devices via at least one of a display device or a user input/output interface.

15. The system of claim 9, wherein the plurality of electronic source documents comprises a plurality of Statement of Work (SOW) templates that are to be used to create SOWs between an organization and one or more of customers of the organization or providers of the organization.

16. A tangible non-transitory computer-readable medium storing computer-executable instructions for use in processing a plurality of electronic source documents, wherein the computer-executable instructions, when executed by one or more processors, cause the one or more processors to:

receive an indication of whether an electronic document processing application is to operate in a first mode or a second mode;

search each of the plurality of electronic source documents for particular source document content, wherein the particular source document content includes a plurality of different content elements;

perform one or more processing actions with respect to one or more occurrences of the particular source document content that the one or more processors detect when searching each of the plurality of electronic source documents, so as to generate electronic output content based on the particular source document content, wherein an occurrence of the particular source document content includes an occurrence of any of the plurality of different content elements, and wherein the one or more processing actions are indicated by an electronic processing template that by:

when the received indication indicates that the electronic document processing application is to operate in the first mode, replacing each of the one or more occurrences of the particular source document content into an occurrence of particular destination document content indicated by the electronic processing template, and when the received indication indicates that the electronic document processing application is to operate in the second mode, generating reporting information with respect to the one or more occurrences of the particular source document content, the electronic output content comprising the reporting information;

cause one or more progress indicators to be presented to the user via at least one of a display device or one or more other input/output devices communicatively coupled to the one or more processors while performing the one or more processing actions with respect to the one or more detected occurrences of the particular source document content, without causing contents of the plurality of electronic source documents to be presented to a user via any of a display device or one or more other input/output devices communicatively coupled to the one or more processors; and write the electronic output content to a plurality of electronic destination documents as a plurality of files at a destination location comprising a folder within an electronic file directory so that portions of the electronic output content are written to locations within the plurality of electronic destination documents that correspond to locations within the plurality of electronic source documents at which the one or more processors detected the one or more occurrences of the particular source document content, wherein the plurality of electronic destination documents corresponds to the electronic source documents on a one-to-one basis.

17. The tangible non-transitory computer-readable medium of claim 16, wherein the computer-executable instructions that cause the one or more processors to search each of the plurality of electronic source documents for the particular source document content comprise computer-executable instructions that cause the one or more processors to search each of the plurality of electronic source documents for any of the plurality of different content elements and to detect an occurrence of the particular source document content when any of the plurality of different content elements is found.

18. The tangible non-transitory computer-readable medium of claim 16, wherein the plurality of electronic source documents is the plurality of electronic destination documents, and wherein the computer-executable instructions that cause the one or more processors to write the electronic output content to the plurality of electronic destination documents comprise computer-executable instructions that cause the one or more processors to write the electronic output content to the plurality of electronic source documents so as to overwrite the contents of the plurality of electronic source documents with the electronic output content.

19. A method for migrating contents of a plurality of electronic documents, the method comprising:

receiving, with an electronic document processing application executing on one or more computing devices each having a processor coupled to a memory configured to store data associated with execution of the electronic document processing application, an indication of a plurality of electronic source documents, wherein the indication of the plurality of electronic source documents comprises an indication of a Statement of Work (SOW) template from which a plurality of electronic content elements are to be migrated;

receiving, with the electronic document processing application executing on the one or more computing devices, an indication of a plurality of electronic destination documents as a plurality of files at a destination location comprising a folder within an electronic file directory, wherein the plurality of electronic destination documents corresponds to the plurality of electronic source documents on a one-to-one basis;

receiving, with the electronic document processing application executing on the one or more computing devices, an indication of the plurality of electronic content elements that the electronic document processing application is to migrate from the plurality of electronic source documents to the a plurality of electronic destination documents;

receiving, with the electronic document processing application executing on the one or more computing devices, an indication of whether the electronic document processing application is to operate in a first mode or a second mode;

searching, with the electronic document processing application executing on the one or more computing devices, each of the plurality of electronic source documents for any of the plurality of electronic content elements;

when the received indication indicates that the electronic document processing application is to operate in the first mode, migrating, with the electronic document processing application executing on the one or more computing devices, each of the plurality of electronic content elements detected from searching each of the plurality of electronic source documents to a location within an electronic destination document that corresponds to a location of the electronic content element within one of the plurality of electronic source documents, without the one or more computing devices presenting contents of the plurality of electronic source documents to a user of the one or more computing devices; and when the received indication indicates that the electronic document processing application is to operate in the second mode, generating, with the electronic document processing application executing on the one or more computing devices, reporting information with respect to the plurality of electronic content elements.

20. The method of claim 19, wherein receiving the indication of the plurality of electronic content elements that the electronic document processing application is to migrate comprises receiving, with the electronic document processing application executing on the one or more computing devices, an indication of an electronic processing template including computer-executable instructions, the computer-executable instructions indicating the plurality of electronic content elements.

21. The method of claim 19, wherein migrating each of the detected electronic content elements to the corresponding location comprises modifying, with the electronic document processing application executing on the one or more computing devices, at least one of the detected electronic content elements.

22. The method of claim 19, wherein migrating each of the detected electronic content elements to the corresponding location comprises migrating, with the electronic document processing application executing on the one or more computing devices, each of the detected electronic content elements to the corresponding location without modifying any of the detected electronic content elements.

23. The method of claim 19, wherein receiving the indication of the plurality of electronic destination documents comprises receiving an indication of a new version of a Statement of Work (SOW) template that is to be used to create a SOW between an organization and one of a customer of the organization or a provider of the organization, wherein the plurality of electronic content elements that the electronic document processing application is to migrate is a subset of electronic content elements included within an old version of the SOW template, and wherein migrating each of the detected electronic content elements is performed without migrating any of the electronic content elements included within the old version of the SOW template that are not included within the subset.

* * * * *